United States Patent
Naini et al.

(10) Patent No.: US 6,209,083 B1
(45) Date of Patent: *Mar. 27, 2001

(54) PROCESSOR HAVING SELECTABLE EXCEPTION HANDLING MODES

(75) Inventors: Ajay Naini; Robert D. Maher, III, both of Plano, TX (US)

(73) Assignee: VIA-Cyrix, Inc., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,236

(22) Filed: Oct. 1, 1997

Related U.S. Application Data

(63) Continuation of application No. 08/613,776, filed on Feb. 28, 1996.

(51) Int. Cl.[7] .................................................. G06F 13/00
(52) U.S. Cl. ......................... 712/229; 712/222; 712/244
(58) Field of Search .................................. 395/570, 591, 395/563; 712/229, 244, 222

(56) References Cited

U.S. PATENT DOCUMENTS

| | | | |
|---|---|---|---|
| 4,736,289 | * | 4/1988 | Eaton ..................................... 395/570 |
| 5,093,908 | * | 3/1992 | Beacom et al. ........................ 395/376 |
| 5,193,158 | * | 3/1993 | Kinney et al. ......................... 395/591 |
| 5,404,466 | * | 4/1995 | Inoue ...................................... 395/568 |
| 5,404,557 | * | 4/1995 | Yamashita ........................ 395/800.23 |
| 5,465,376 | * | 11/1995 | Yoshida .................................. 395/800 |
| 5,524,263 | * | 6/1996 | Griffth et al. .......................... 395/800 |
| 5,546,599 | * | 8/1996 | Song ....................................... 395/800 |
| 5,559,977 | * | 9/1996 | Avnon et al. .......................... 395/591 |
| 5,561,775 | * | 10/1996 | Kurosawa et al. ............... 395/800.23 |
| 5,764,942 | * | 6/1998 | Kahle et al. ............................ 395/390 |

* cited by examiner

*Primary Examiner*—Eddie P. Chan
*Assistant Examiner*—Gautam R. Patel
(74) *Attorney, Agent, or Firm*—Carr & Ferrell LLP

(57) ABSTRACT

An FPU configured to operate in normal and fast modes. In normal mode, floating point instructions are stalled in an address calculation unit of the processor until the previously issued floating point instruction has cleared the FPU, thereby indicating that the previous floating point instruction will not have an exception. In fast mode, the address calculation unit will issue a next floating point instruction to the FPU, where it is held in a 4-deep instruction queue, regardless of whether a prior instruction has cleared. By eliminating stalls in the instruction execution pipeline caused by floating point instructions being held in the address calculation unit pending clearance of the prior floating point instruction, the instruction execution pipeline may issue floating point instructions to the FPU at a faster rate.

18 Claims, 5 Drawing Sheets

FIG. 6a

| CLK No.: | 1 | 2 | 3 | 4 | 5 | 6 | 7 | 8 | 9 | 10 | 11 | 12 | 13 |
|---|---|---|---|---|---|---|---|---|---|---|---|---|---|
| ID:  | FP1 | FP2 | FP3 | FP3 | FP3 | FP4 | FP4 | FP5 | FP5 | FP6 | FP6 | FP7 | FP7 |
| AC1: |     | FP1 | FP2 | S   | S   | FP3 | S   | FP4 | S   | FP5 | S   | FP6 | S   |
| AC2: |     |     | FP1 | FP2 | FP2 | S   | FP3 | S   | FP4 | S   | FP5 | S   | FP6 |
| EX:  |     |     |     | FP1 | S   | FP2 | S   | FP3 | S   | FP4 | S   | FP5 | S   |
| FPU: |     |     |     | FP1 | FP1 | FP2 | FP2 | FP3 | FP3 | FP4 | FP4 | FP5 | FP5 |

FIG. 6b

| CLK No.: | 1 | 2 | 3 | 4 | 5 | 6 | 7 | 8 | 9 | 10 | 11 | 12 | 13 |
|---|---|---|---|---|---|---|---|---|---|---|---|---|---|
| ID:  | FP1 | FP2 | FP3 | FP4 | FP5 | FP6 | FP6 | FP7 | FP7 | FP8 | FP8 | FP9 | FP9 |
| AC1: |     | FP1 | FP2 | FP3 | FP4 | FP5 | FP5 | FP6 | S   | FP7 | S   | FP8 | S   |
| AC2: |     |     | FP1 | FP2 | FP3 | FP4 | FP4 | S   | FP6 | S   | FP7 | S   | FP8 |
| EX:  |     |     |     | FP1 | FP2 | FP3 | FP4 | FP5 | S   | FP6 | S   | FP7 | S   |
| FPU: |     |     |     | FP1 | FP1 | FP2 | FP2 | FP3 | FP3 | FP4 | FP4 | FP5 | FP5 |

PROCESSOR HAVING SELECTABLE EXCEPTION HANDLING MODES

This application is a continuation of No. 08/613,776 Feb. 28, 1996.

BACKGROUND OF THE INVENTION

1. Field of the Invention

The present invention generally relates to floating point units and, more particularly, to a floating point unit having an alternate, or fast, mode of operation which reduces pipeline stalls by issuing instructions regardless of the state of the previously issued instruction.

2. Description of Related Art

Pipelining is a commonly practiced technique by which processing speed is increased by starting the execution of a next instruction sequence before a previous instruction sequence is completed. As the instructions within a pipe are at various stages of execution, correcting an error, commonly referred to as an exception, which occurs during the execution of a pipelined instruction can prove complicated. Accordingly, devices which use piplining are typically equipped to resolve exceptions in a manner which will minimize disruption to instructions flowing through the pipe.

An instruction execution pipeline of a processor typically includes instruction fetch, instruction decode, address calculation, execution and writeback stages. While both integer and floating point instructions are initially handled by the instruction execution pipeline, after completing the address calculation stage, floating point instructions are issued to a floating point unit (FPU) for the execution and writeback stages.

If the instruction execution pipeline has a floating point instruction in the pipe, the instruction will not be issued to the FPU until the previously issued floating point instruction has been checked for error. By delaying issuance of the floating point instruction, in the event that an exception occurs during execution of the previous floating point instruction, the FPU will be able to precisely identify and resolve the exception.

While such a technique greatly simplifies the task of repairing the instruction execution pipeline, it often causes stalls in the flow of instructions through the pipe. More specifically, the address calculation stage will not issue a floating point instruction to the FPU until it is determined that the prior floating point instruction will not generate an exception. Thus, the address calculation stage waits to issue a next floating point instruction until after execution of the prior floating point instruction is complete. However, execution of most floating point instructions require more than one clock cycle. As a result, therefore, the floating point instruction stalls in the address calculation stage while waiting for the prior floating point instruction to finish.

Thus, it can be readily seen from the foregoing that it would be desirable to provide a method of issuing floating point instructions in a manner which reduces stalling of the instruction execution pipeline and a processor uniquely configured to permit operation of the FPU in plural modes. It is, therefore, the object of this invention to provide such a method and processor.

SUMMARY OF THE INVENTION

The present invention is directed to an FPU configured to operate in plural modes. In a first, or normal, mode, an address calculation unit of the processor will not issue a next floating point instruction to the FPU until the previously issued floating point instruction has cleared the FPU, thereby indicating that the previous floating point instruction will not have an exception. Further, in the event that an exception is detected, the precise instruction boundary of the exception will be known. In a second, or fast, mode, the address calculation unit of the processor will issue a next floating point instruction to the FPU, where it is held in a 4-deep instruction queue, regardless of whether a prior instruction will have an exception, thereby speeding issuance of floating point instructions to the FPU by eliminating stalls in the instruction execution pipeline caused by floating point instructions being stalled in the address calculation unit. While the precise boundaries of exceptions are not available in fast mode operation, the processor is equipped to handle the exception anyway. The FPU may be set to operate in normal or fast mode by setting bit 4 of configuration control register CCR4 of the register set.

BRIEF DESCRIPTION OF THE DRAWING

The present invention may be better understood, and its numerous objects, features and advantages will become apparent to those skilled in the art by reference to the accompanying drawing, in which:

FIG. 2b is a block diagram of an instruction execution pipeline of the processor of FIG. 2a;

FIG. 3 illustrates a system register set for the processor of FIG. 2a;

FIG. 5 is a block diagram of a portion of the processor and FPU of FIG. 2a;

FIG. 6a illustrates operation of the FPU of FIG. 2a in normal mode; and

FIG. 6b illustrates operation of the FPU of FIG. 2a in fast mode.

DETAILED DESCRIPTION

The detailed description of an exemplary embodiment of the computer system of the present invention is organized as follows:

1. Computer System
   1.1. System
   1.2. Processor
   1.2.1. System Register Set
   1.3 FPU
   1.3.1. FPU Operation in Normal Mode
   1.3.2. FPU Operation in Fast Mode This organizational table, and the corresponding headings used in this detailed description, are provided for the convenience of reference only. Detailed description of conventional or known aspects of the computer system are omitted as to not obscure the description of the invention with unnecessary detail.

1. Computer System

Figure 1:
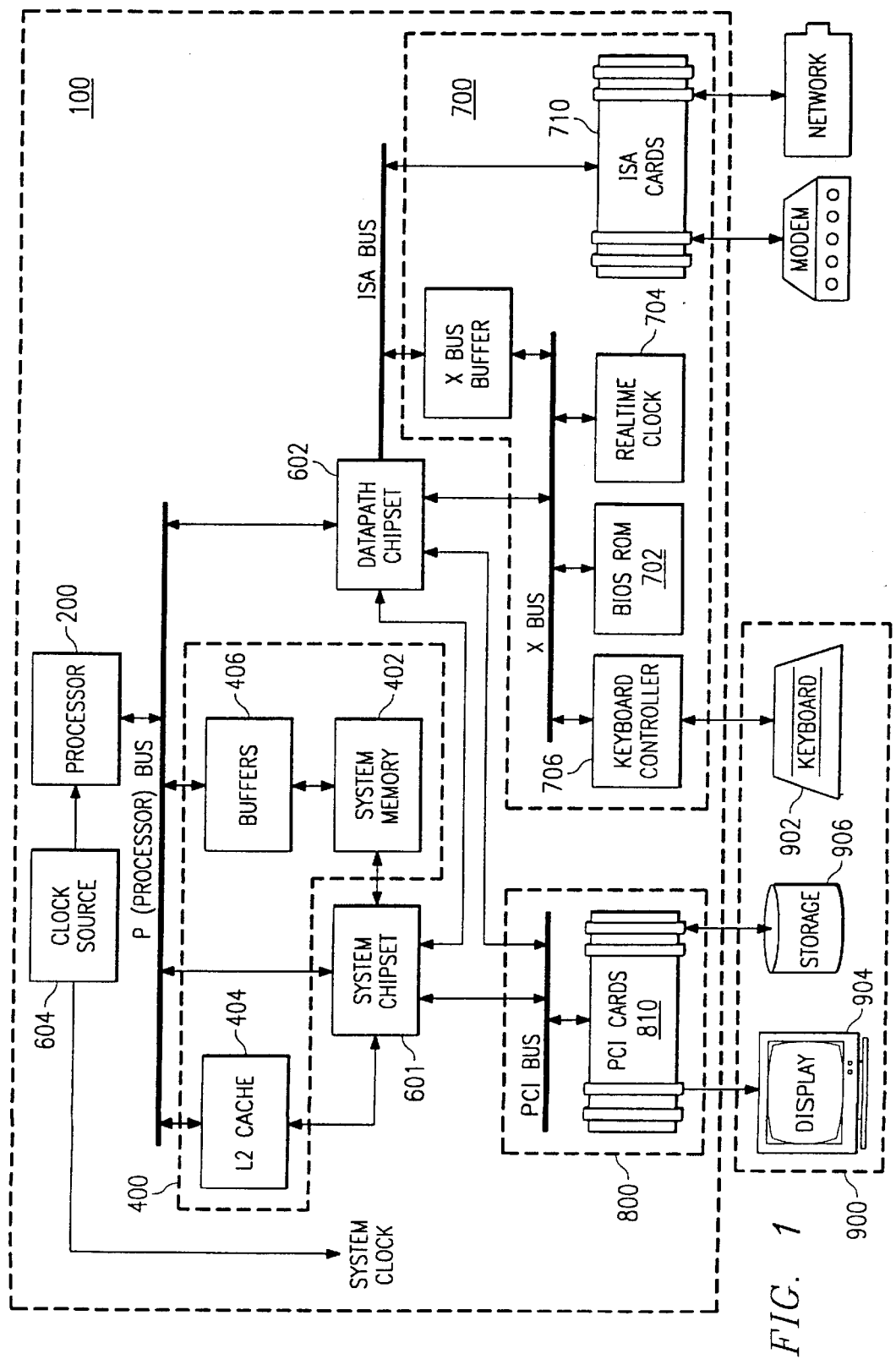
FIG. 1 is a block diagram of an exemplary computer system utilizing an exemplary processor constructed in accordance with the teachings of the present invention.

FIG. 1 illustrates an exemplary computer system, including a system or motherboard 100 with a processor 200, memory subsystem 400, and system logic including system chipset 601 and datapath chipset 602.

Figure 2A:
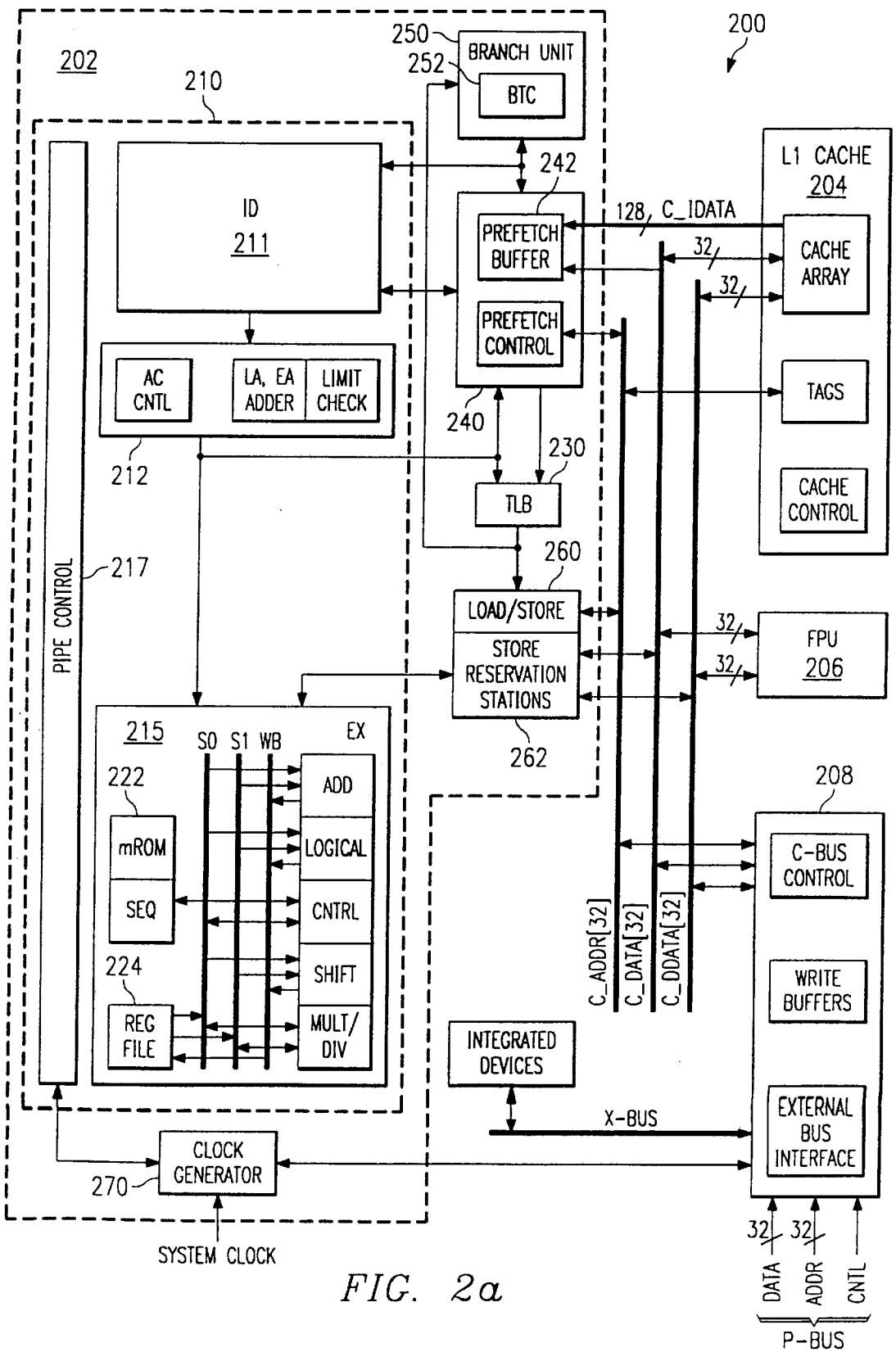
FIG. 2a is a block diagram of the processor of FIG. 1.
Figure 2B:
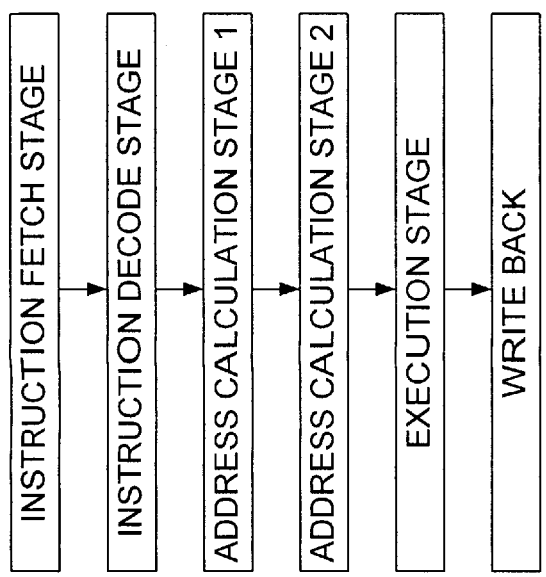

FIGS. 2a and 2b illustrate the exemplary x86 processor 200.

1.1. System

Referring to FIG. 1, motherboard 100 includes the processor 200 interfaced to the memory subsystem 400 over a P-BUS (sometimes referred to as a CPU or local bus). The system logic includes, in addition to the system chipset 601 and datapath chipset 602, an external clock source 604 (which provides an external clock input to the processor 200 and system clock signals to the rest of the motherboard 100).

For the exemplary computer system, the P-BUS is a conventional 486-type 32-bit address and data bus. For the exemplary computer system, the only system elements that reside on the P-Bus are the processor 200, memory subsystem 400, and the system and datapath chipsets 601 and 602. According to the exemplary division of system logic functions, the system chipset interfaces to a conventional 32-bit PCI peripheral bus, while the datapath chipset interfaces to a 16-bit ISA peripheral bus and an internal 8-bit X-bus. Some current systems allow for a special VL-bus direct interface to the P-BUS for video/graphics and other peripherals.

For 32-bit systems with a 32 bit P-BUS, some current system logic designs combine the system and datapath chipset functions into a single chipset. For 64-bit systems with a 64-bit P-BUS, the pin count required by the 64-bit data bus width currently necessitates that the system and datapath chipset functions be split as indicated in FIG. 1.

Processor 200 is coupled over the P-BUS to system DRAM (memory) 402 and L2 (level 2) cache 404—data buffers 406 control P-BUS loading by the system DRAM. The system chipset 602 includes P-BUS, DRAM, and L2 cache control.

The datapath chipset 602 interfaces to the conventional X bus. The X bus is an internal 8-bit bus that couples to the BIOS ROM 702 and the RTC (real time clock) 704. In addition, a conventional 8-bit keyboard controller 706 resides on the X-bus. The system and datapath chipsets 601 and 602 provide interface control for the 16-bit ISA bus and the 32-bit PCI bus. The ISA bus maintains compatibility with industry standard peripherals, coupling to ISA peripheral card slots 710. The PCI bus provides a higher performance peripheral interface for selected peripherals, including coupling to PCI peripheral card slots 810—in particular, a video/graphics card (including VRAM) 802 provides a video/graphics interface, while a storage controller 804 (which may be included as part of the system chipset) interfaces to storage peripherals.

The motherboard 100 couples through the PCI, ISA, and X buses to external peripherals 900, such as keyboard 902, display 904, and mass storage 906. Network and modem interconnections are provided as ISA cards (but could be PCI cards).

1.2. Processor

Referring to FIG. 2a, exemplary processor 200 is an x86 processor that uses a modular architecture in which pipelined CPU core 202, L1 (level 1) cache 204, FPU (floating point unit) 206, and bus controller 208 are interconnected over an arbitrated C-BUS. The CPU core interfaces to the C-BUS through prefetch and load/store modules. The bus controller 208 provides the interface to the external P-Bus.

Referring to FIG. 2b, the processor 200 uses a six stage instruction execution pipeline: instruction fetch IF, instruction decode ID, address calculation AC1/AC2, execution EX, and writeback WB. The superpipelined AC stage performs instruction operand access—register file access, and for memory reference instructions, cache access.

Referring to FIG. 2a, CPU core 202 includes an execution core 210 that encompasses the ID, AC, EX, and WB execution stages. A prefetch unit 240 performs instruction fetch in conjunction with a branch unit 250, prefetching instruction bytes for Instruction Decode. A load/store unit 260 performs operand loads and stores results for the AC, EX, and WB stages. A clock generator 270 receives the external system clock, and generates internal core and other clocks, including performing clock multiplication and implementing clock stopping mechanisms.

Execution core 210 includes a decode unit (ID) 211, an AC unit 212, and an EX unit 215. A pipe control unit 217 controls the flow of instructions through pipe stages of the execution core, including stalls and pipe flushes. The EX unit is microcode controlled by a microcontrol unit 222 (microsequencer and microROM) and a general register file 224. The EX unit performs add, logical, and shift functions, and includes a hardware multiplier/divider. Operands are transferred from the register file or cache (memory) over two source buses S0 and S1, and execution results are written back to the register file or the cache (memory) over a writeback bus WB.

Prefetch unit (PFU) 240 performs instruction fetch, fetching instruction bytes directly from the cache 204, or from external memory through the bus controller 208—instruction bytes are transferred in 8 byte blocks to ID 211 for decoding. The PFU fetches prefetch blocks of 16 instruction bytes (cache line) into a three-block prefetch buffer 242. A virtual buffer management scheme is used to allocate physical prefetch buffers organized as a circular queue.

Branch unit (BU) 250 supplies prefetch addresses for COF instructions—predicted-taken branches and unconditional changes of flow (UCOFs) (jumps and call/returns). The BU includes a branch target cache (BTC) 252 for branches and jumps/calls and a return stack RSTK (not shown) for returns—the BTC is accessed with the instruction pointer for the instruction prior to the COF, while the RSTK is controlled by signals from ID 211 when a call/return is decoded. For branches that miss in the BTC and are by default predicted not-taken, the PFU will speculatively prefetch along the not-predicted taken path to enable prefetching to switch immediately in case the branch resolves taken.

The decode unit (ID) 211 performs Instruction Decode, decoding one x86 instruction per clock. ID receives 8 bytes of instruction data from prefetch buffer 242 each clock, returning a bytes-used signal to allow the prefetch buffer to increment for the next transfer.

Decoded instructions are dispatched to AC 212, which is superpipelined into AC1 and AC2 pipe stages, performing operand access for the EX stage of the execution pipeline. For memory references (reads or writes), the AC1 stage calculates one linear address per clock (address calculations involving three components require an additional clock), with limit checking being performed in AC2—if paging is enabled, the AC2 stage performs linear-to-physical address translation through a TLB (translation lookaside buffer) 230. Instruction operands are accessed during AC2—for non-memory references, the register file is accessed, and for memory references, the cache 204 is accessed.

The cache 204 is virtually indexed and physically tagged such that set selection is performed with the linear (untranslated) address available in AC1, and tag comparison is performed with the physical (translated) address available early in AC2, allowing operand accesses that hit in the cache to be supplied by the end of AC2 (the same as a register access). For accesses that miss in the cache, cache control logic initiates an external bus cycle through the bus controller 208 to load the operand.

After operand access, the AC unit issues integer instructions to the EX stage 215, and floating point instructions to the FPU 206. The EX stage 215 and the FPU 206 perform the EX and WB stages of the execution pipeline.

The EX stage 215 receives source operands over the two source buses S0/S1 (i) as immediate data passed along with the instruction from the AC stage 212, (ii) from the register file 224, and/or for memory references, (iii) from the L1 cache 204 or external memory through the load/store unit 260. In particular, for memory references that require an external bus cycle, EX stage 215 will stall until operand load is complete.

Execution results are written back in the WB stage either to the register file 218, or to the cache (memory)—stores to the cache (memory) are posted in store reservation stations in the load/store unit 260.

Load/store (LDST) unit 260 performs operand loads and result stores for the AC/EX stages 212 and 215 respectively. In addition, for branches that miss in the BTC 252, the LDST unit 260 issues prefetch requests for the target. Loads have the highest priority, except in the case of branches that miss in the BTC 252 where the prefetch request for the target is given priority. Four reservation station buffers 262 are used for posting stores—stores can be posted conditionally pending resolution of a branch, retiring only if the branch resolves correctly. Stores are queued in program order—operand loads initiated during AC2 may bypass pending stores.

The L1 (level one) cache 204 is a 16K byte unified data/instruction cache, organized as 4 way set associative with 256 lines per set and 16 bytes (4 dwords) per cache line. The cache 204 can be operated in either write-through or write-back mode—to support a write-back coherency protocol, each cache line includes 4 dirty bits (one per dword).

Bus controller (BC) 208 interfaces to the 32-bit address and data P-BUS, and to two internal buses—the C-BUS and an X-BUS. Alternatively, the BC can be modified to interface to an external 64-bit data P-BUS (such as the Pentium® bus defined by Intel Corporation of Santa Clara, Calif.). The BC 208 includes 8 write buffers for staging external writes cycle.

The C-BUS (collectively depicted in FIG. 2a as C_ADDR[32], C_DATA[32], and C_DDATA[32])is an arbitrated bus that interconnects the execution core 210, Prefetch unit 240, LDST unit 260, cache 204, FPU 206, and the BC 208—C-BUS control is in the BC. The C-BUS includes a 32 bit address bus C_ADDR, two 32-bit data buses C_DATA and C_DDATA, and a 128-bit (16 byte cache line) dedicated instruction bus. C_DATA and C_DDATA can be controlled to provide for 64 bit transfers to the FPU 206, and to support interfacing the cache to a 64-bit external data bus. In general, for 32-bit data transfers, the C_DATA bus is used for loads coming from off-chip through the BC to the LDST unit, the cache, and/or the prefetch unit, and the C_DDATA bus is used for stores into the cache or external memory through the BC 208. For instruction fetch misses, instruction data is provided over the C_DATA bus to the Prefetch unit at the same time it is provided to the cache.

The X-bus is an extension of the external bus interface that allows peripheral devices to be integrated on chip.

1.2.1 System Register Set

Figure 3:
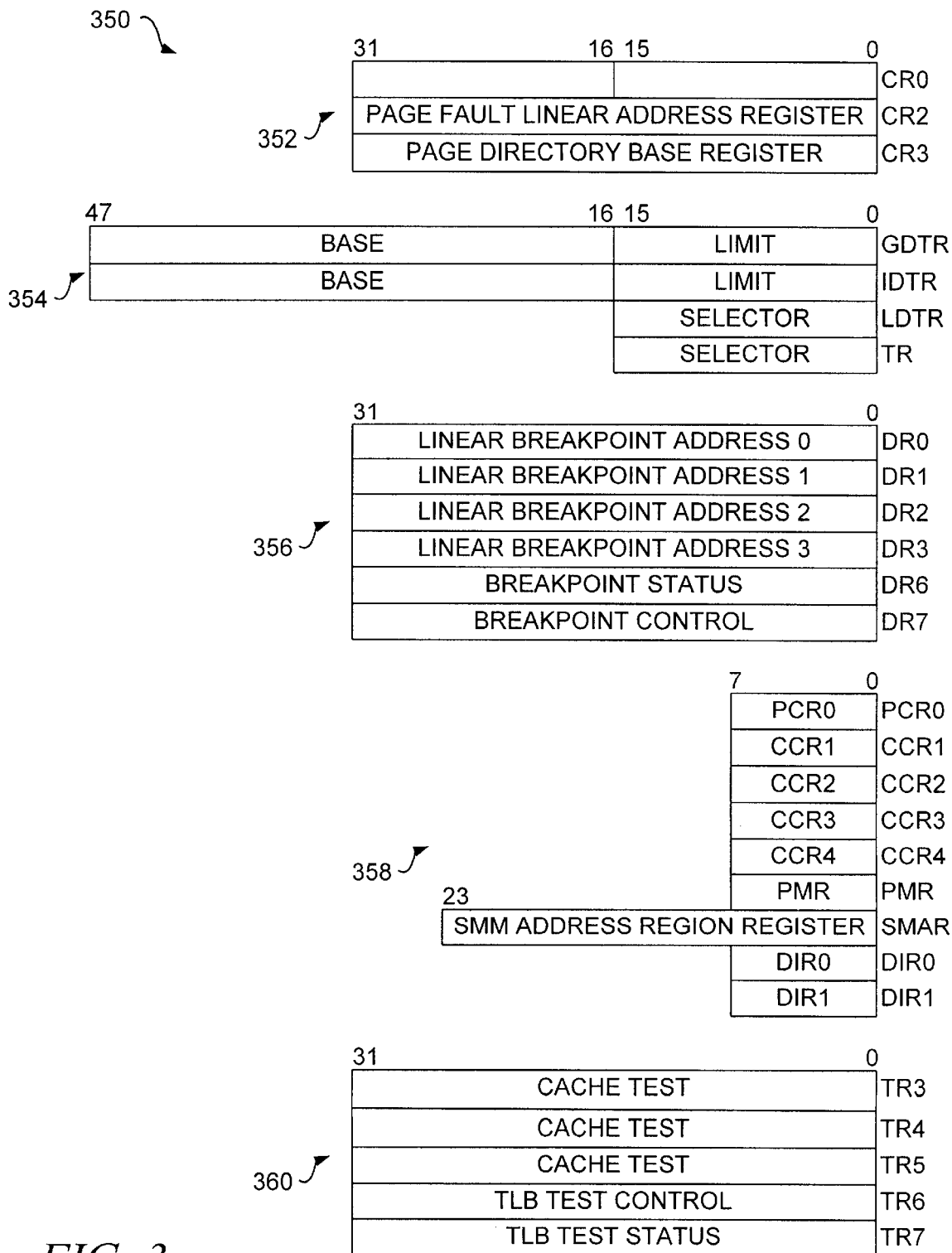

Referring next to FIG. 3, a system register set 350 for the processor 200 will now be described in greater detail. The system register set 350 is comprised of control registers 352, descriptor table registers and task register 354, debug registers 356, configuration registers 358 and test registers 360.

The control registers 352 control certain aspects of the processor 200 such as paging, coprocessor functions and segment protection. When a paging exception occurs while paging is enabled, the control registers 352 retain the linear address of the access that caused the exception. The control registers 352 are comprised of control registers CR0, CR2 and CR3. The CR0 register contains system control flags that control operating modes and indicate the general state of the processor 200. The lower 16 bits of control register CR0 are referred to as the machine status word (MSW).

When paging is enabled and a page fault is generated, the CR2 register retains the 32-bit linear address of the address that caused the fault. Register CR3 contains the 20 most significant bits of the physical base address of the page directory. The page directory must always be aligned to a 4-KByte page boundary, so the lower 12 bits of CR3 are not required to specify the base address.

CR3 contains the page cache disable (PCD) and page write through (PWT) bits. During directory table accesses, the state of the PCD bit is reflected on the PCD pin and the PWT bit is driven on the PWT pin. The PCD pin should be used to control write policy in an external cache.

The descriptor table registers 354 are comprised of the global, interrupt and local descriptor table registers (GDTR, IDTR and LDTR). The GDTR, IDTR and LDTR are used to specify the location of the data structures that control segmented memory management. The GDTR holds a 32-bit linear base address and 16-bit linear address for the global descriptor table (GDT). The GDT is an array of up to 8192 8-byte descriptors. When a segment register is loaded from memory, the TI bit in the segment selector chooses either the GDT or the Local Descriptor Table (LDT) to locate a descriptor. If TI=0, the index portion of the selector is used to locate a given descriptor within the GDT table.

The IDTR hods a 32-bit linear base address and 16-bit limit for the interrupt descriptor table (IDT). The IDT is an array of 256 8-byte interrupt descriptors, each of which is used to point to an interrupt service routine. Every interrupt that may occur in the system must have an associated entry in the IDT.

The LDTR holds a 16-bit selector for the local descriptor table (LDT). The LDT is an array of up to 8192 8-byte descriptors. When the LDTR is loaded, the LDTR selector indexes an LDT descriptor that must reside in the GDT. The contents of the selected descriptor are cached on-chip in the hidden portion of the LDTR. The processor 200 does not access the GDT again until the LDTR is reloaded.

The task register (TR) holds a 16-bit selector for the current task state segment (TSS) table. The TR is loaded and stored via the LTR and STR instructions, respectively.

Debug registers 356 support debugging on the processor 200. Memory addresses loaded in the debug registers 356, referred to as "breakpoints", generate a debug exception when a memory access of a specified type occurs to the specified address. Debug registers DR0–DR3 each contain the linear address for one of four possible breakpoints. Each breakpoint is further specified by debug control register DR7. Debug register DR6 reflects conditions that were in effect at the time the debug exception occurred.

The configuration registers 358 are comprised of an 8-bit performance control register PCR0, four 8-bit configuration control registers CCR1, CCR2, CCR3 and CCR4, a power management control register PMR, one 24-bit SMM address region register SMAR and two 8-bit internal read-only device identification registers DIR0 and DIR1. The configuration control registers CCR1–4 include control for the on-chip write-back cache and SMM features.

The test registers 360 are comprised of test registers TR3-7. Test registers 3–5 are used for cache testing while test registers 6–7 are used for translation lookaside buffer (TLB) testing.

Figure 4:
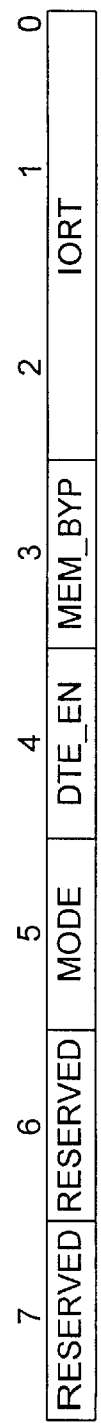
FIG. 4 illustrates configuration control register CCR4 of the system register set of FIG. 3.

Referring next to FIG. 4, configuration control register CCR4 362 will now be described in greater detail. Bits 0–2 are used to specify the I/O recovery time (IORT), i.e., the minimum number of bus clocks between I/O accesses. Bit 3 specifies whether memory read bypassing (MEM_BYP) is enabled. Bit specifies whether enable directory table entry cache (DTE_EN) is enabled. Bit 4 specifies whether the FPU 206 is to operate in normal mode or in fast mode. If bit 4 is set to 0, the FPU 206 operates in normal mode. If bit 4 is set to 1, the FPU 206 operates in fast mode. Finally, bits 6–7 are reserved for future use.

1.3 FPU

Figure 5:
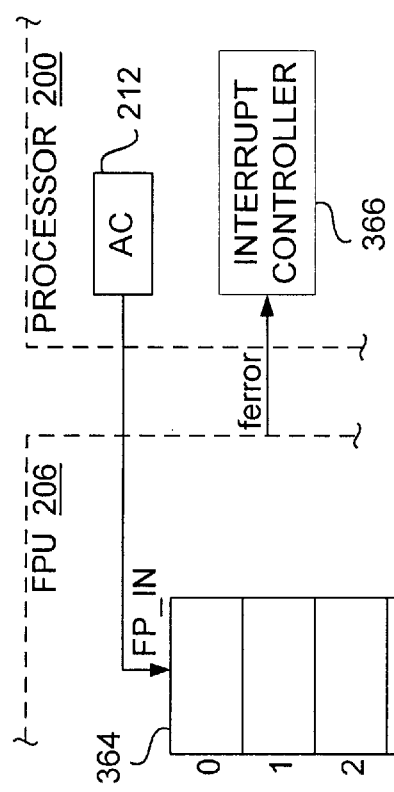

Referring next to FIG. 5, selected portions of the processor 200 and the FPU 206 will now be described in greater detail. The FPU 206 includes a 4-deep instruction queue 364 coupled to the second stage AC2 of the AC 212 to receive floating point instructions therefrom. If an exception is detected during execution of a floating point instruction received from AC 212, for example, if a divide by 0 is attempted, an error signal will be transmitted from the FPU 206 to an interrupt controller via line $f_{error}$. The interrupt controller will then initiate appropriate corrections.

1.3.1 FPU Operation in Normal Mode

Referring next to FIG. 6a, operation of the FPU 206 in normal mode when bit 5 of the CCR4 362 is set to 0 will now be described in greater detail. In normal mode, the AC2 stage delays issuing of floating point instructions to the EX stage of the FPU 206 until after the prior instruction issued to the FPU 206 clears, thereby eliminating the possibility that a next floating point instruction will be issued to the FPU 206 before an exception is detected in the prior instruction issued thereto. In describing the operation of the FPU 206 in normal mode, it is presumed that the FPU 206 includes the previously described 4-deep instruction queue 364 capable of holding up to four issued floating point instructions for execution and that the latency, i.e., the time required for the FPU 206 to complete an instruction, is 2 clock cycles.

In clock cycle 1, a first floating point instruction FP1 enters ID 211 for decoding. In clock cycle 2, FP1 enters AC 212 for calculation of a linear address in stage AC1 and a second floating point instruction FP2 enters ID 211. In clock cycle 3, FP1 enters stage AC2 for limit checking, FP2 enters AC 212 for stage AC1 and a third floating point instruction FP3 enters ID 211.

The first pipeline stall in normal mode occurs in clock cycle 4. In this cycle, FP1 is issued to the FPU 206 for execution and completion of the instruction and FP2 enters stage AC2. Because FP2 has not yet cleared AC 212, FP3 stalls in ID 211 and cannot enter AC 212. It should be noted that FIG. 5a shows FP1 entering EX and FPU simultaneously to indicate that while the execution stage within the FPU 206 consumes only a single clock cycle, the instruction will not clear the FPU 206 for two clock cycles.

Stalling continues in clock cycle 5. Because FP1 has not yet cleared FPU 206, is prohibited from issuing FP2. Furthermore, since FP2 is stalled in AC 212, FP3 remains stalled in ID 211.

By clock cycle 6, FP1 has cleared the FPU 206, thereby enabling AC 212 to issue FP2 to the FPU 206. FP3 and FP4 are now able to enter AC 212 and ID 211, respectively. However since FP3 was stalled in ID 211 for two clock cycles, stage AC2 of the AC 212 has emptied.

By clock cycle 7, the pattern of stalls in the pipe clearly emerges. By prohibiting AC 211 from issuing a next floating point instruction until the prior floating point instruction clears FPU 206, FP3, FP4, FP5 and FP6 are respectively stalled in AC 211 during clock cycles 7, 9, 11 and 13 due to the respective failure of FP2, FP3, FP4 and FP5 to clear the FPU 206. In turn, by stalling in AC 211, FP3, FP4, FP5 and FP6 respectively cause FP4, FP5, FP6 and FP7 to stall in ID 211.

1.3.2. FPU Operation in Fast Mode

Referring next to FIG. 6b, operation of the FPU 206 in fast mode when bit 5 of the CCR4 362 is set to 1 will now be described in greater detail. In fast mode, the AC2 stage will issue floating point instructions to the EX stage of the FPU 206 even though the prior instruction issued to the FPU 206 has not cleared. It is acknowledged that issuing instructions in fast mode raises the possibility that an exception will be detected after the instruction has been issued to the FPU 206. While this may prevent the FPU exception from being precisely detected, i.e., it may be unclear which instruction has caused the exception in the FPU 206, the interrupt controller is equipped to handle this type of exception.

As in normal mode, in describing the operation of the FPU 206 in fast mode, it is presumed that the FPU 206 includes the previously described 4-deep instruction queue 364 capable of holding up to four issued floating point instructions for execution and that the latency, i.e., the time required for the FPU 206 to complete an instruction, is 2 clock cycles.

In clock cycle 1, a first floating point instruction FP1 enters ID 211 for decoding. In clock cycle 2, FP1 enters AC 212 for calculation of a linear address in stage AC1 and a second floating point instruction FP2 enters ID 211. In clock cycle 3, FP1 enters stage AC2 for limit checking, FP2 enters AC 212 for stage AC1 and a third floating point instruction FP3 enters ID 211.

In clock cycle 4, FP1 is issued to the FPU 206 for execution and completion of the instruction and FP2 enters stage AC2 of the AC 212, FP3 enters stage AC1 of the AC 212 and FP4 enters ID 211.

Operation in fast mode avoids the normal mode stall in clock cycle 5 because FP2 can enter the FPU 206 even though FP1 has yet to clear. Furthermore, by issuing FP2, stalls further back in the pipe are avoided. Specifically, since FP2 is issued, instead of stalling in AC11, FP3 enters AC2. Similarly, instead of stalling in ID 211, FP4 enters AC1 and FP4 may enter ID 211.

By avoiding the stall in clock cycle 5, the gap in the pipe appearing in clock cycle 6 caused by FP3 being stalled in ID 211 during clock cycle 5 is avoided. Instead, the pipe continues to flow smoothly in clock cycle 6 with FP1 clearing the FPU 206, FP3 being issued to the FPU 206 for queuing in the instruction queue, FP4 entering AC2 and FP5 entering the AC1 stage of AC 212 and FP6 entering ID 211.

While avoiding many of the stalls which occur in normal mode, occasional stalls will still occur in fast mode due to the instruction queue located in the FPU 206 filling up. When the instruction queue fills, AC2 cannot issue another floating point instruction to the FPU 206 until one of the queued instructions clears. As instructions are held in AC2, this prevents later instructions from entering AC1, thereby stalling floating point instructions at ID 211. For example, during clock cycles 7, 9, 11 and 13, FP6, FP7, FP8 and FP9 are stalled in ID 211. In turn, the stalls in ID 211 during clock cycles 7, 9 and 11 causes AC2 to empty in clock cycles 8, 10 and 12 and EX to empty in clock cycles 9, 11 and 13.

In any event, fast mode operation of the FPU 206 allows floating point instructions to enter the FPU 206 quicker. For example, in fast mode, FP5 enters the FPU 206 in clock cycle 8. In contrast, in normal mode operation, FP5 would not enter the FPU 206 until clock cycle 12. By issuing floating point instructions earlier, bottlenecks in the instruction execution pipe may be avoided.

Thus, there has been described and illustrated herein, an FPU uniquely configured to operate in both normal and fast modes. By permitting the optional issuance of a floating point instruction before the prior floating point instruction completes, stalls may be reduced throughout the instruction execution pipeline, thereby providing the potential to achieve an improvement in the performance of the instruction execution pipeline on the order of 20–30%. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of operating a processor which includes a floating point unit (FPU) comprising the steps of:
   programming indicia to select between a first mode of exception handling and a second mode of exception handling;
   operating said processor in said first mode of exception handling when said indicia so indicates in which said processor delays issuance of a next instruction in a series of pipelined floating point instructions to said FPU until a preceding instruction in said series of pipelined floating point instructions previously issued to said FPU clears; and
   operating said processor in said second mode of exception handling when said indica so indicates in which said processor issues said next instruction in said series of pipelined floating point instructions to said FPU without waiting for said preceding instruction in said series of pipelined floating point instructions previously issued to said FPU to clear.

2. A method of operating a processor according to claim 1 wherein said processor includes an address calculation unit and further comprising the step of:
   in said first mode of exception handling, stalling said next instruction in said series of pipelined floating point instructions in said address calculation unit if said preceding instruction in said series of pipelined floating point instructions has not cleared said FPU.

3. A method of operating a processor according to claim 2 wherein said FPU includes an N-deep instruction queue for holding N instructions and further comprising the steps of:
   said address calculation unit issuing said preceding instruction in said series of pipelined floating point instructions to said N-deep instruction queue;
   holding said preceding instruction of said series of pipelined floating point instructions in said N-deep instruction queue until said FPU is ready to execute said preceding instruction of said series of pipelined floating point instructions; and
   in said second mode of exception handling, stalling said next instruction of said series of pipelined floating point instructions in said address calculation unit if said prior instruction of said series of pipelined floating point instructions fills said N-deep instruction queue.

4. A method of operating a processor according to claim 3 and further comprising the steps of:
   detecting an exception for said preceding instruction of said series of pipelined floating point instructions after said next instruction of said series of pipelined floating point instructions has been issued; and
   handling said exception for said preceding instruction of said series of pipelined floating point instructions after said next instruction of said series of pipelined floating point instructions has been issued.

5. A method of operating a processor according to claim 1 wherein the step of programming indicia to select between a first mode of exception handling and a second mode of exception handling further comprises the steps of:
   setting a selected bit of a configuration control register to 0 to operate said processor in said first mode of exception handling; and
   setting said selected bit of said configuration control register to 1 to operate said processor in said second mode of exception handling.

6. A microprocessor, comprising:
   means for programming indicia to select between a first mode of exception handling and a second mode of exception handling;
   means for executing a series of pipelined floating point instructions;
   means for issuing said series of pipelined floating point instructions to said execution means in said first mode of exception handling in which issuance of a next instruction in said series of pipelined floating point instructions is delayed until said execution means completes execution of a preceding instruction in said series of pipelined floating point instructions; and
   means for issuing said series of pipelined floating point instructions to said execution means in said second mode of exception handling in which said next instruction in said series of pipelined floating point instructions is issued before said execution means completes execution of said preceding instruction in said series of pipelined floating point instructions.

7. A microprocessor according to claim 6 and further comprising:
   means for calculating addresses for said series of pipelined floating point instructions; and
   means for stalling said next instruction in said series of pipelined floating point instructions in said address calculation means if said execution means has not completed execution of said preceding instruction issued thereto.

8. A microprocessor according to claim 6 and further comprising:
   means for storing floating point instructions issued to said execution means;
   means for calculating addresses for said series of pipelined floating point instructions; and,
   means for stalling said next instruction in said series of pipelined floating point instructions in said address calculation means if said preceding instruction issued to said execution means fills said storage means.

9. A microprocessor, comprising:
   a CPU core;
   a floating point unit, coupled to said CPU core, said floating point unit executing floating point instructions issued by said CPU core; and a register set having a control bit for controlling issuance of floating point instructions by said CPU core to said floating point unit, the microprocessor operating in a first mode exception handling when said control bit is set and operating in a second mode of exception handling if said control bit is unset;

wherein said CPU core issues a next floating point instruction to said floating point unit prior to said floating point unit completing execution of a preceding floating point instruction if said microprocessor is operating in said second mode.

10. A microprocessor according to claim 9 wherein said register set further comprises a configuration control register which includes said control bit.

11. A microprocessor according to claim 9, wherein:

said floating point unit includes an N-deep instruction queue for holding floating point instructions issued by said CPU core for execution by said floating point unit;

said next floating point instruction stalling in said CPU core if said preceding floating point instruction fills said N-deep instruction queue.

12. A microprocessor according to claim 9 wherein said CPU core further comprises:

an address calculation unit for issuing floating point instructions to said floating point unit;

wherein said next floating point instruction is stalled in said address calculation unit during execution of said preceding floating point instruction by said floating point unit if said control bit is unset.

13. A microprocessor according to claim 12 wherein said register set further comprises a configuration control register which includes said control bit.

14. A computer, comprising:

a system bus;

a memory subsystem; and a microprocessor;

said memory subsystem and said microprocessor coupled to said system bus for bidirectional exchanges of address, data and control signals therebetween;

said microprocessor including:

a CPU core;

a floating point unit, coupled to said CPU core, said floating point unit executing floating point instructions issued by said CPU core; and a register set having a control bit for controlling issuance of floating point instructions by said CPU core to said floating point unit, the microprocessor operating in a first mode of exception handling when said control bit is set and operating in a second mode of exception handling if said control bit is unset;

wherein said CPU core issues a next floating point instruction to said floating point unit prior to said floating point unit completing execution of a preceding floating point instruction if said microprocessor is operating in said second mode.

15. A computer according to claim 14 wherein said register set further comprises a configuration control register which includes said control bit.

16. A computer according to claim 14 wherein:

said floating point unit includes an N-deep instruction queue for holding floating point instructions issued by said CPU core for execution by said floating point unit;

said next floating point instruction stalling in said CPU core if said preceding floating point instruction fills said N-deep instruction queue.

17. A computer according to claim 14 wherein said CPU core further comprises:

an address calculation unit for issuing floating point instructions to said floating point unit;

wherein said next floating point instruction is stalled in said address calculation unit during execution of said preceding floating point instruction by said floating point unit if said control bit is unset.

18. A computer according to claim 17 wherein said register set further comprises a configuration control register which includes said control bit.

* * * * *